US012671814B2

(12) United States Patent
Young et al.

(10) Patent No.: US 12,671,814 B2
(45) Date of Patent: Jun. 30, 2026

(54) ENTROPY CODING USING PRE-DEFINED, FIXED CDFS

(71) Applicant: GOOGLE LLC, Mountain View, CA (US)

(72) Inventors: Joseph Young, Mountain View, CA (US); In Suk Chong, Mountain View, CA (US); Debargha Mukherjee, Cupertino, CA (US)

( * ) Notice: Subject to any disclaimer, the term of this patent is extended or adjusted under 35 U.S.C. 154(b) by 64 days.

(21) Appl. No.: 18/803,186

(22) Filed: Aug. 13, 2024

(65) Prior Publication Data

US 2025/0088635 A1     Mar. 13, 2025

Related U.S. Application Data

(60) Provisional application No. 63/537,865, filed on Sep. 12, 2023.

(51) Int. Cl.
| *H04N 19/13* | (2014.01) |
| *H04N 19/18* | (2014.01) |
| *H04N 19/91* | (2014.01) |

(52) U.S. Cl.
CPC ............. *H04N 19/13* (2014.11); *H04N 19/18* (2014.11); *H04N 19/91* (2014.11)

(58) Field of Classification Search
CPC ......... H04N 19/13; H04N 19/18; H04N 19/91
See application file for complete search history.

(56) References Cited

U.S. PATENT DOCUMENTS

| 11,178,409 B2 * | 11/2021 | Young | H04N 19/60 |
| 11,228,763 B2 * | 1/2022 | Karczewicz | H04N 19/91 |
| 2006/0141493 A1 * | 6/2006 | West | G16B 20/00 |
| | | | 702/20 |
| 2007/0253479 A1 * | 11/2007 | Mukherjee | H03M 7/30 |
| | | | 375/E7.181 |
| 2022/0272367 A1 * | 8/2022 | Matsuba | H04N 19/423 |
| 2023/0247216 A1 * | 8/2023 | Huang | H04N 19/513 |
| | | | 375/240.15 |
| 2023/0262243 A1 * | 8/2023 | Ikonin | H04N 19/42 |
| | | | 382/239 |
| 2023/0328276 A1 * | 10/2023 | Zhang | H04N 19/176 |

FOREIGN PATENT DOCUMENTS

| TW | 202236854 A | * | 9/2022 | H04N 19/91 |
| TW | I899426 B | * | 10/2025 | H04N 19/91 |

* cited by examiner

*Primary Examiner* — Dramos Kalapodas
(74) *Attorney, Agent, or Firm* — Young Basile Hanlon & MacFarlane, P.C.

(57)                ABSTRACT

Entropy coding a sequence of transform coefficients includes determining a predictor value corresponding to a transform coefficient, selecting a probability model from a set of pre-defined probability models based on the predictor value, and entropy coding a symbol associated with the transform coefficient using the selected probability model. The predictor value can be calculated based on a previous predictor value used for coding an immediately preceding symbol associated with an immediately preceding transform coefficient of the sequence of the transform coefficients. The predictor value can be further calculated based on the immediately preceding symbol.

20 Claims, 10 Drawing Sheets

Figure 7:
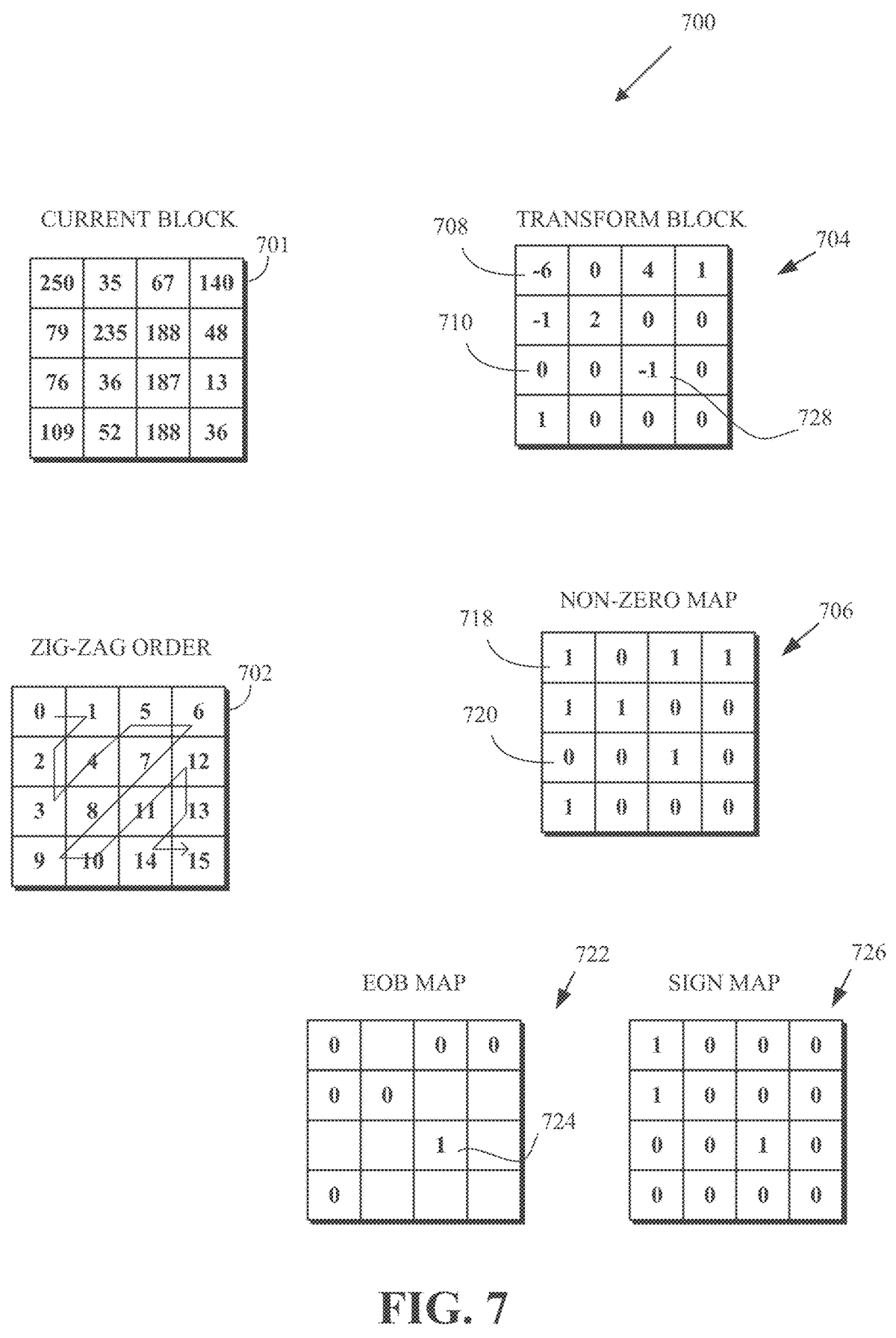

700

CURRENT BLOCK

701

| 250 | 35 | 67 | 140 |
|-----|-----|-----|-----|
| 79 | 235 | 188 | 48 |
| 76 | 36 | 187 | 13 |
| 109 | 52 | 188 | 36 |

708    TRANSFORM BLOCK    704

710

728

| -6 | 0 | 4 | 1 |
|-----|-----|-----|-----|
| -1 | 2 | 0 | 0 |
| 0 | 0 | -1 | 0 |
| 1 | 0 | 0 | 0 |

ZIG-ZAG ORDER

702

| 0 | 1 | 5 | 6 |
|-----|-----|-----|-----|
| 2 | 4 | 7 | 12 |
| 3 | 8 | 11 | 13 |
| 9 | 10 | 14 | 15 |

NON-ZERO MAP 718    706

720

| 1 | 0 | 1 | 1 |
|-----|-----|-----|-----|
| 1 | 1 | 0 | 0 |
| 0 | 0 | 1 | 0 |
| 1 | 0 | 0 | 0 |

EOB MAP    722

724

| 0 | | 0 | 0 |
|-----|-----|-----|-----|
| 0 | 0 | | |
| | | 1 | |
| 0 | | | |

SIGN MAP    726

| 1 | 0 | 0 | 0 |
|-----|-----|-----|-----|
| 1 | 0 | 0 | 0 |
| 0 | 0 | 1 | 0 |
| 0 | 0 | 0 | 0 |

DETERMINE A PREDICTOR
VALUE

1104

SELECT, BASED ON THE
PREDICTOR VALUE, A
PROBABILITY MODEL

1106

ENTROPY CODE A SYMBOL
USING THE PROBABILITY
MODEL

ENTROPY CODING USING PRE-DEFINED, FIXED CDFS

REFERENCES TO RELATED APPLICATIONS

This applications claims priority to U.S. Provisional Patent Application Ser. No. 63/537,865, filed Sep. 12, 2023, the entire disclosure of which is incorporated herein by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including lossy and lossless compression techniques. Lossless compression techniques include entropy coding.

SUMMARY

One aspect of the disclosed implementations is a method that includes determining a predictor value corresponding to a transform coefficient of a sequence of transform coefficients; selecting, based on the predictor value, a probability model from a set of pre-defined probability models; and entropy coding a symbol associated with the transform coefficient using the probability model.

Another aspect of the disclosed implementations is a device that includes a processor that is configured to determine a predictor value corresponding to a transform coefficient of a sequence of transform coefficients; select, based on the predictor value, a probability model from a set of pre-defined probability models; and entropy code a symbol associated with the transform coefficient using the probability model.

Another aspect of the disclosed implementations is a non-transitory computer-readable storage medium that includes executable instructions that, when executed by a processor, facilitate performance of operations that include determining a predictor value corresponding to a transform coefficient of a sequence of transform coefficients; selecting, based on the predictor value, a probability model from a set of pre-defined probability models; and entropy coding a symbol associated with the transform coefficient using the probability model.

Variations in these aspects and other aspects of this disclosure are disclosed in the following detailed description of the implementations, the appended claims, and the accompanying figures.

BRIEF DESCRIPTION OF THE DRAWINGS

The description herein makes reference to the accompanying drawings described below, wherein like reference numerals refer to like parts throughout the several views.

FIG. 7 is a diagram illustrating syntax elements associated with coding transform coefficients.

DETAILED DESCRIPTION

Figure 1:
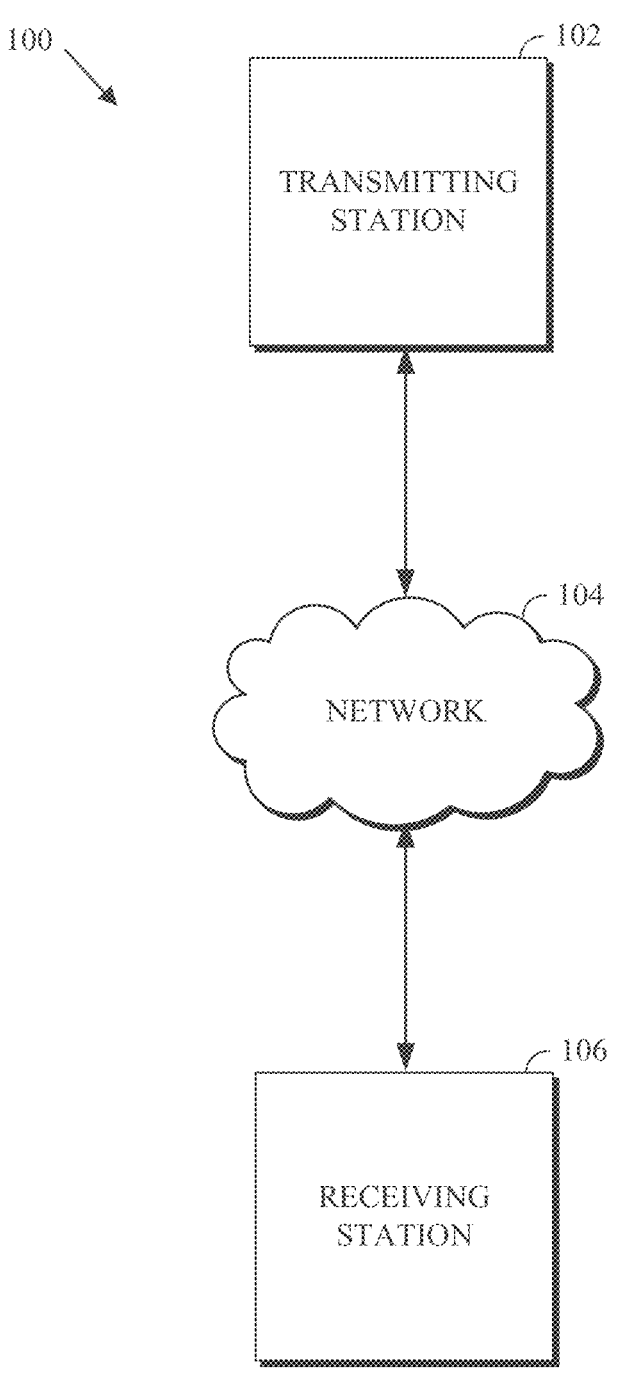
FIG. 1 is a schematic of an example of a video encoding and decoding system.

Video compression schemes may include breaking respective images, or frames, into smaller portions, such as blocks, and generating an encoded bitstream using techniques to limit the information included for respective blocks thereof. The encoded bitstream can be decoded to re-create or reconstruct the source images from the limited information. The information may be limited by lossy coding, lossless coding, or some combination of lossy and lossless coding.

One type of lossless coding is entropy coding, where entropy is generally considered the degree of disorder or randomness in a system. Entropy coding compresses a sequence in an informationally efficient way. A lower bound of the length of the compressed sequence is the entropy of the original sequence. An efficient algorithm for entropy coding aims to generate a code (e.g., in bits) whose length approaches this entropy. For a particular sequence of syntax elements, the entropy associated with the code may be defined as a function of the probability distribution of observations (e.g., symbols, values, outcomes, hypotheses, etc.) for the syntax elements over the sequence. Arithmetic coding, for example, can use the probability distribution to construct the code.

However, a codec may not receive a sequence together with its corresponding probability distribution. Instead, probability estimation may be used in video codecs to implement entropy coding. The probability distribution of the observations may be estimated using one or more probability estimation models (also called probability models or probability distributions herein) that model the distribution occurring in an encoded bitstream. These models help the estimated probability distribution approach the actual probability distribution. According to such techniques, entropy coding can reduce the number of bits required to represent the input data to close to a theoretical minimum (i.e., the lower bound). The probability models may be expressed or given by various mathematical functions, including Cumulative Distribution Functions (CDFs).

Conventional techniques for updating CDFs for syntax elements in a data stream typically require substantial memory and storage. This is due to the large number of contexts and the need for dynamically updating the CDFs to reflect changes in the statistical distribution of the data stream over time. Consequently, both the encoder and decoder face significant storage demands to maintain CDFs that are specifically tailored for each context. In video compression, a "context" refers to the surrounding data or conditions that influence the probability distribution of a syntax element being encoded or decoded. This context can include neighboring elements, block types, transform type used, or other relevant factors that shape the statistical characteristics of the current element. The context depends on the syntax element being coded. By analyzing the context, codecs can select the most appropriate CDF for entropy coding. This ensures that the chosen CDF more accurately reflects the likelihood of the current syntax element's values, leading to more efficient compression.

Implementations according to this disclosure utilize fixed sets of CDFs in conjunction with predictor functions to select appropriate CDFs from these sets. A predictor function generates a predictor value or index that adapts to changes in the statistical distribution of the data stream over time. This approach enables more efficient entropy coding with reduced storage requirements for CDFs. The predictor value or index is used to identify the corresponding pre-defined CDF in a table that stores a fixed set of CDFs.

Using the pre-defined set of CDFs and the predictor function, significant storage reduction can be achieved. Experiments have shown that, with respect to coding base levels of transform coefficients, for six-symbol CDF, storage can be reduced from 81 bits to 22 bits per context; and for four-symbol CDF, storage is reduced from 51 bits to 22 bits per context. "X-symbol CDF" means a CDF that is used for a syntax element that can take on X possible values, or symbols. This reduction in storage requirements may also allow for an increase in the number of contexts, which can further enhance data modeling and the accuracy of entropy coding. Moreover, using the pre-defined set of CDFs results in faster processing speeds associated with entropy coding, particularly at higher Quantization Parameters (QPs), since higher QPs may result in fewer symbols and the statistics or cumulative probabilities are known in advance (e.g., pre-determined). The teachings herein improve the efficiency (e.g., memory or storage efficiency) of probability estimation by incorporating the predictor function to adapt to changes in the statistical distribution of the data stream over time.

Further details of entropy coding using pre-defined, fixed CDFs are described herein first with reference to a system in which the teachings may be incorporated. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figures 2, 3:
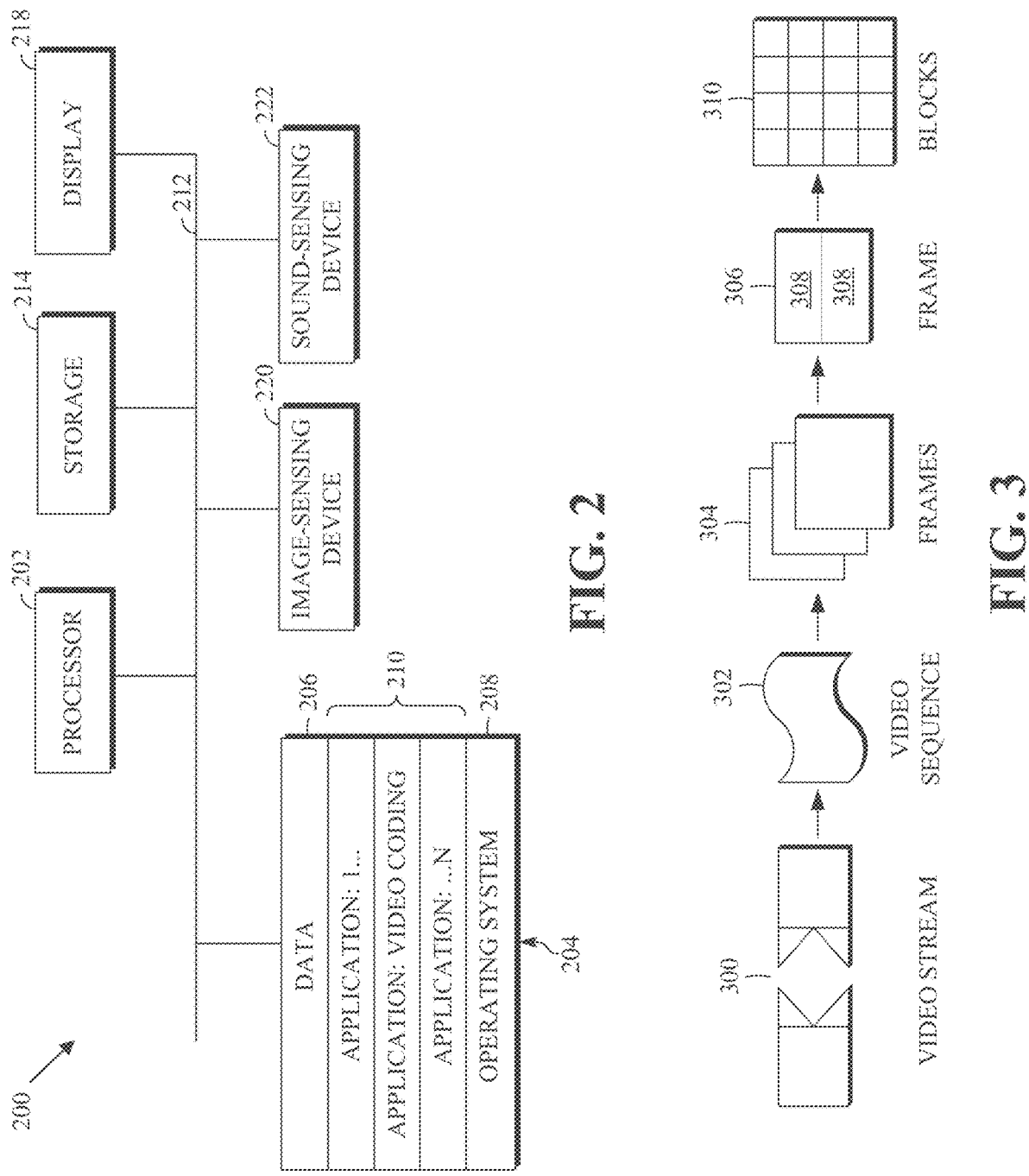
FIG. 2 is a block diagram of an example of a computing device that can implement a transmitting station or a receiving station.
FIG. 3 is a diagram of an example of a video stream to be encoded and subsequently decoded.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a video streaming protocol based on Hypertext Transfer Protocol-based (HTTP).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data. Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random-access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
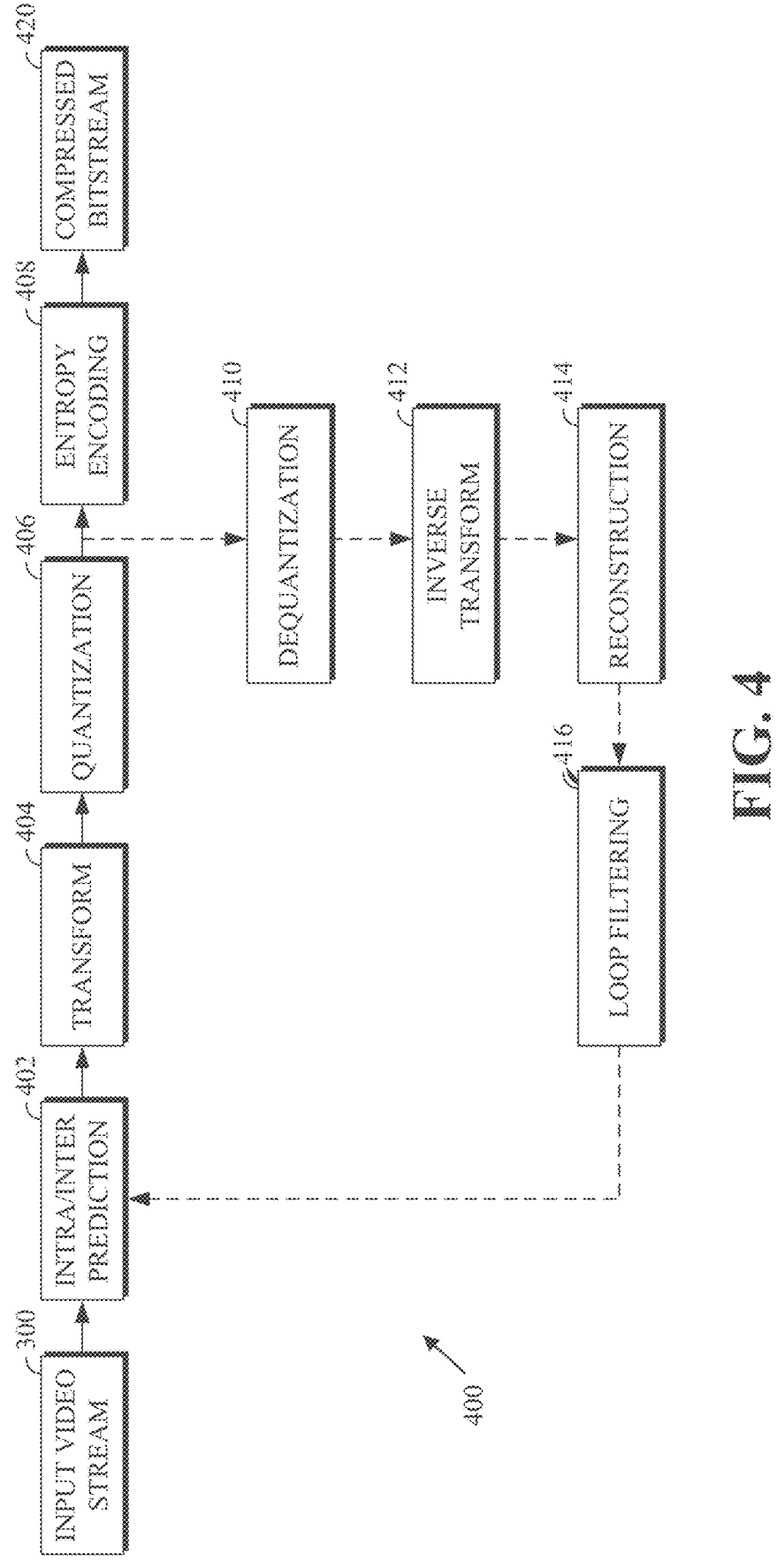
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
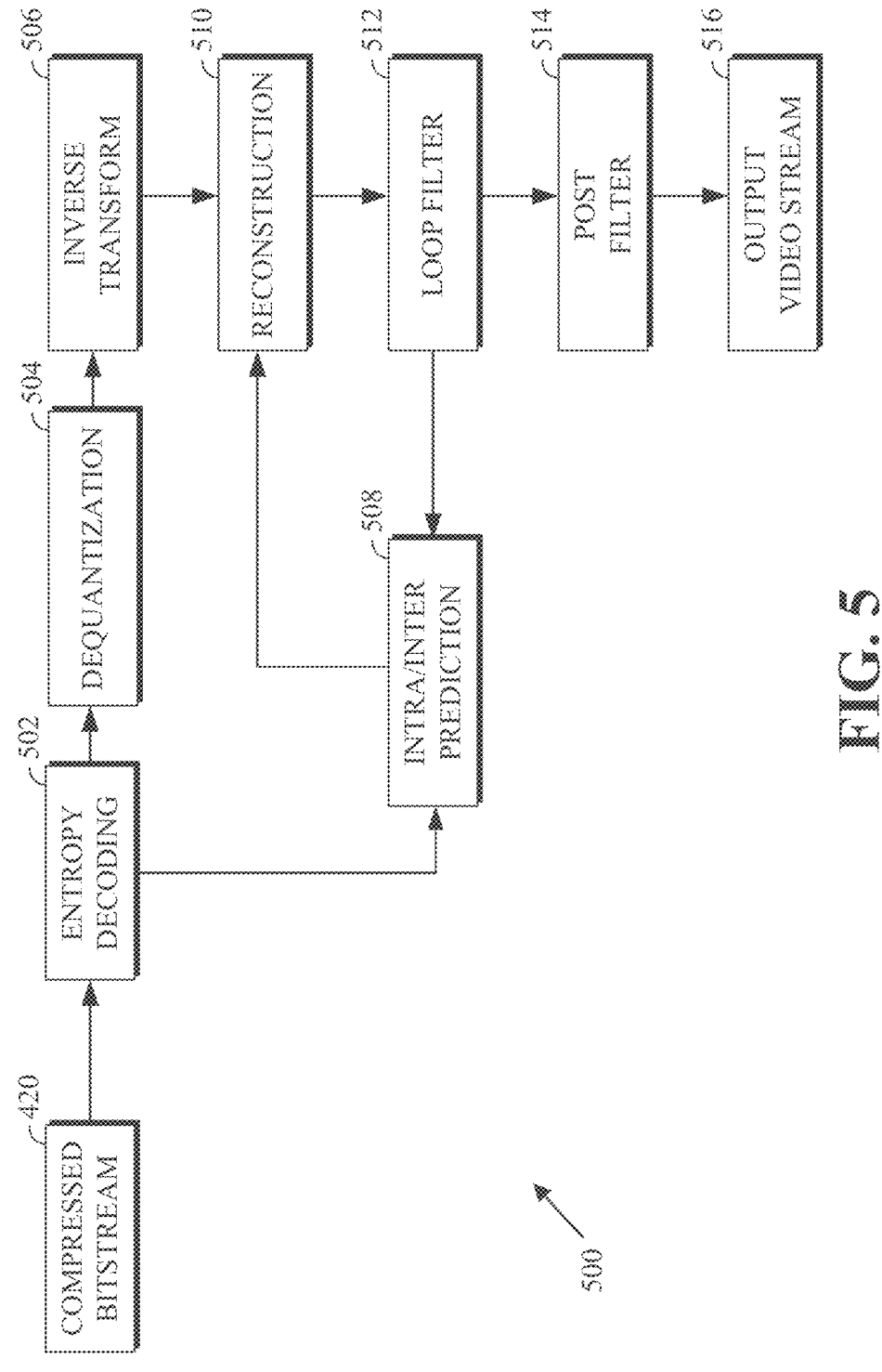
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

As can be appreciated from the description of the encoder 400 and the decoder above, bits are generally used for one of two things in an encoded video bitstream: either content prediction (e.g., inter mode/motion vector coding, intra prediction mode coding, etc.) or residual or coefficient coding (e.g., transform coefficients). Encoders may use techniques to decrease the bits spent on representing this data. For example, a coefficient token tree (which may also be referred to as a binary token tree) may specify the scope of the value, with forward-adaptive probabilities for each branch in this token tree. The token base value is subtracted from the value to be coded to form a residual, then the block is coded with fixed probabilities. A similar scheme with minor variations including backward-adaptivity is also possible. Adaptive techniques can alter the probability models as the video stream is being encoded to adapt to changing characteristics of the data. In any event, a decoder is informed of (or has available) the probability model used to encode an entropy-coded video bitstream so the decoder can decode the video bitstream.

That is, and as described initially above, a video codec may use arithmetic coding to materialize the entropy coding of syntax elements (such as the coding modes and residual coefficient data referenced above). The coding efficiency largely depends not only on the accuracy, but also on the storage size (e.g., reduction of memory requirement) of the probability model. The probability model may be equivalently represented by either a probability mass function (PMF) or a CDF of the syntax element.

Further, as initially described, conventional techniques for updating CDFs for syntax elements require a large amount of memory and storage due to the large number of contexts and a respective CDF for each of the contexts, and process of dynamically updating the CDFs with changes in the statistical distribution of the data stream over time. This resulted in a large storage requirement for the CDFs that are specifically fit for each context, in an encoder and a decoder.

A desirable adaptive technique for updating a probability model may be implemented with a fixed approach, which uses a pre-defined set of CDFs and a predictor function which may compute or generate a predictor value and/or an index that may adapt to the changes in the statistical distribution of the data stream over time. This predictor value and/or the index may be used to find the corresponding pre-defined CDF in a CDF table that stores the pre-defined set of CDFs.

Figure 6:
FIG. 6 is a flowchart of a technique for entropy coding a sequence of syntax elements.
Figure 6:
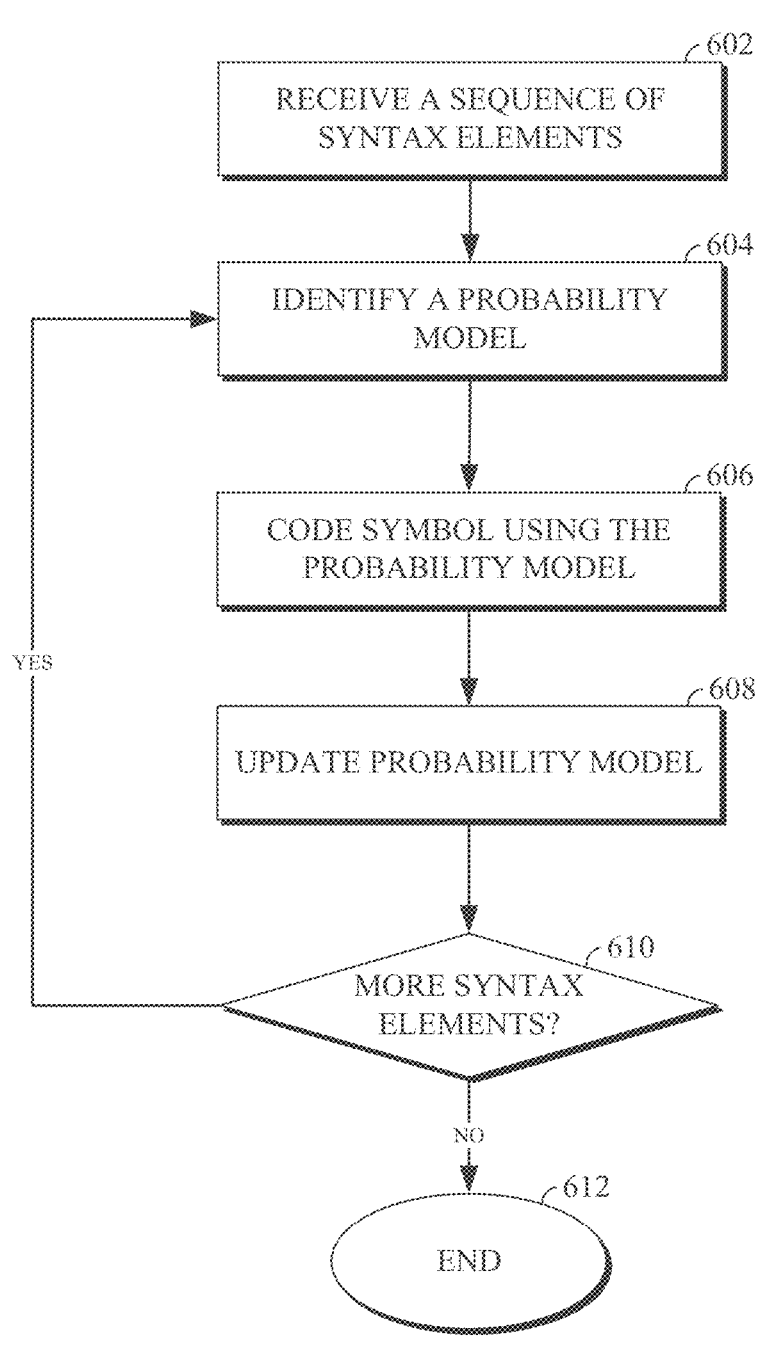

FIG. 6 is a flowchart of a technique 600 for entropy coding a sequence of syntax elements. The technique 600 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as the processor 202, may cause the computing device to perform the technique 600. The technique 600 may be performed at an entropy coding stage of an encoder, such as the entropy encoding stage 408 of the encoder 400, or the entropy coding stage of a decoder, such as the entropy decoding stage 502 of the decoder 500. While the technique 600 is shown as including steps arranged in a certain sequence, not all steps need to be performed, and the steps may be performed in a different sequence or be combined.

Conventionally, coding base values of context coefficients typically involves the use of adaptive CDFs that dynamically adjust to the statistical properties of the data being encoded. For each context, an individual CDF is maintained and updated based on the observed symbols during the encoding process. This adaptive approach ensures that the CDFs reflect the most current probability distributions of the syntax elements, allowing for efficient entropy coding. However, adaptive CDFs require significant memory and computational resources to manage frequent updates and store CDFs for the numerous contexts. The teachings herein, as already described, use a pre-defined set of CDFs along with a predictor value to determine the next CDF of the set to use for coding, for example, the next coefficient (e.g., the next magnitude of the next quantized coefficient).

At 602, a sequence of syntax elements is received. The sequence of syntax elements can be or include a sequence of quantized transform coefficients of a current block. Coding quantized transform coefficients may include coding respective coefficient base levels of the quantized transform coefficients. A coefficient base level specifies the base level of a coefficient. The sequence of syntax elements can be as described with respect to FIG. 7.

FIG. 7 is a diagram 700 illustrating syntax elements associated with coding transform coefficients. The diagram 700 depicts a current block 701, a scan order 702, a (e.g., quantized) transform block 704, a non-zero map 706, an end-of-block (EOB) map 722, and a sign map 726. The current block 701 is illustrated as a 4×4 block. However, any block size is possible. For example, the current block can have a size (i.e., dimensions) of 4×4 pixels, 8×8 pixels, 16×16 pixels, 32×32 pixels, or any other rectangular block size, including non-square dimensions. The current block 701 can be a block of a current frame.

The transform block 704 can be a block of a same or similar size to the size of the current block 701. The transform block 704 includes non-zero coefficients (e.g., a coefficient 708) and zero coefficients (e.g., a coefficient 710). As described above, the transform block 704 may include transform coefficients for the residual block corresponding to the current block 701. Also as described above, the transform coefficients are entropy coded, such as at the entropy coding stage 408 of FIG. 4, and as discussed in further detail below.

To encode a transform block, a video coding system may traverse the transform block in a scan order and encode (e.g., entropy encode) the transform coefficients as the transform coefficients are respectively traversed (i.e., visited). The scan order may depend upon the transform type or kernel used to generate the transform block or on some other variable associated with coding the current block and/or the transform block. The scan order may be a fixed scan order for all blocks. In the example shown, the scan order 702 is a zigzag scan order. Therein, the top left corner of the transform block (also known as the DC coefficient) is first traversed, the next coefficient in the scan order (i.e., the transform coefficient corresponding to the location labeled "1") is traversed, and so on. Regardless of the scan order, a one-dimensional structure (e.g., an array or sequence) of transform coefficients can result from the traversal of the two-dimensional transform block using the scan order.

Another set of syntax elements associated with coding a transform block may be described with reference to the non-zero map 706, which may be derived from the transform block 704. The non-zero map 706 indicates which transform coefficients of the transform block 704 are zero and which are non-zero. A non-zero coefficient and a zero coefficient can be indicated with values one (1) and zero (0), respectively, in the non-zero map 706. For example, the non-zero map 706 includes a non-zero 718 at Cartesian location (0, 0) corresponding to the coefficient 708 and a zero 720 at Cartesian location (2, 0) corresponding to the coefficient 710.

The EOB map 722 may be derived from the non-zero map, such as the non-zero map 706, and the scan order, such as the scan order 702. The EOB map 722 indicates whether a non-zero transform coefficient of the transform block 704 is the last non-zero coefficient in the scan order 702. If a non-zero coefficient is not the last non-zero coefficient in the transform block 704, then it can be indicated with the binary bit zero (0) in the EOB map 722. If, on the other hand, a non-zero coefficient is the last non-zero coefficient in the transform block 704, then it can be indicated with the binary value one (1) in the EOB map 722. As shown in this example, as the transform coefficient corresponding to the scan location 11 (i.e., the last non-zero transform coefficient 728) is the last non-zero coefficient of the transform block 704, it is indicated with the EOB value 724 of one (1); all other non-zero transform coefficients are indicated with a zero (0).

Another set of syntax elements associated with coding a transform block may be described with reference to the sign map 726. A sign map indicates which non-zero transform coefficients of a transform block have positive values and which transform coefficients have negative values. The sign map 726 illustrates a sign map for the transform block 704. In the sign map 726, negative transform coefficients are indicated with a 1 and positive transform coefficients are identified with a 0 (e.g., transform coefficients that are zero are considered positive).

Referring again to FIG. 6, the sequence of syntax elements for entropy coding received at 602 may comprise one or more arrays derived from respective transform blocks. For example, syntax elements comprising the index positions of last non-zero transform coefficients for respective transform blocks, such as from the EOB map 722, may be coded using the entropy coding techniques described herein, or by other lossless coding techniques. By coding the EOB in the scan order, any zeros in the array of transform coefficients after the EOB value 724 in the scan order may be ignored in the coding. For example, a one-dimensional (1D) array corresponding to the transform block 704 has the entries [−6, 0, −1, 0, 2, 4, 1, 0, 0, 1, 0, −1, 0, 0, 0, 0]. The final four zeros in the sequence may be omitted from entropy coding. Further, syntax elements comprising the sequence of values of the sign map (e.g., in a scan order) may be coded using the entropy coding techniques described herein, but preferably are encoded as raw bits (e.g., bypassing entropy coding). By coding the sign map information, the sequence of syntax elements for entropy coding received at 602 may correspond to the absolute values of the magnitudes of the transform coefficients. For the transform block 704, the entries of the 1D array would correspond to [6, 0, 1, 0, 2, 4, 1, 0, 0, 1, 0, 1]. As such, the sequence of syntax elements for entropy coding received at 602 includes an unsigned array of quantized transform block magnitudes or their encoded representations from the bitstream. However, other syntax elements may be entropy coded according to the teachings herein.

As such, the sequence of syntax elements can be or include the magnitudes of the quantized transform coefficients up to the EOB value. Each of the magnitudes of quantized transform coefficients is entropy coded (encoded into and decoded from a compressed bitstream). Different techniques can be used to code quantized transform coefficients. In an example, the levels of the quantized transform coefficients can be broken into different planes. Two, three, or more planes can be used. In an example, two planes may be used. A lower-level plane may correspond to coefficient levels between 0 and 2, whereas a higher-level plane can be used to code levels that are above 2. The separation into planes can be used to assign a rich context model to at least the lower-level plane. In an example, the context can include one or more of the size of the quantized transform block and neighboring coefficient information. The higher-level plane can use a reduced context model for levels between 3 to 15 and may directly code the residuals above level 15 using an Exp-Golomb code.

At 604, a probability model for entropy coding a next syntax element of the sequence is identified (e.g., selected or determined). The probability model is identified from a pre-defined set of CDFs. The pre-defined set of CDFs may be derived empirically based on encoding a variety of data streams. The probability model may be identified based on the syntax element being coded. For example, a probability model used for entropy coding a magnitude (e.g., a base level) of a transform coefficient may be different from the probability model used for entropy coding another type of syntax element. Again, the next syntax element can be the base value of the next quantized transform coefficient to be entropy coded. Furthermore, and as further described herein, the CDF selected for coding the next syntax element may depend on a location of the corresponding transform coefficient in the transform block.

The probability model can be identified based on a predictor value that is used to select a CDF from a pre-defined set of CDFs. The technique 600 can maintain a respective predictor value for each possible context model. A predictor function may be used to compute or generate the predictor value, which in turn may be used (e.g., as a lookup) to find and/or predict the pre-defined CDF to be used for entropy coding the next syntax element (e.g., value) in the sequence. For example, the predictor function may be used to determine a predictor value based on a previously observed symbol and a previous predictor value associated with the context model. In an example, the prediction function can be a regression function as shown in equation (1):

$$X(n) = \text{decay} * X(n-1) + (1 - \text{decay}) * \text{coeff\_base}(n-1) \quad (1)$$

In equation (1), coeff_base (n−1) is the base value of the previously observed symbol (e.g., the base value of the coefficient entropy coded immediately before the current transform coefficient), X(n−1) is the previous predictor value, and X(n) is the new predictor value that is used for CDF selection. Decay can be a value used to control the speed of adaptation (e.g., how fast the new predictor value adapts to statistical changes, or how fast the previous predictor values are forgotten, etc.) as the statistical distribution of the data stream changes over time. In an example, the value of Decay can be 0.98. However, any other appropriate value that corresponds to a desired or a preferred speed of adaptation can be used. In an example, the value of Decay can be obtained using a function that varies the adaptation speed based on a location of the symbol being entropy coded within the sequence. The predictor value X(n) is then used to obtain (e.g., retrieve) the CDF from the pre-defined set of CDFs.

In some implementations, using the predictor value to identify the pre-defined CDF from the pre-defined set of CDFs may include mapping the predictor value into a CDF table that includes the pre-defined set of CDFs. Each entry in the CDF table corresponds to (e.g., is) one of the pre-defined CDFs. It is noted that a CDF may include more than one probability value. For example, if a probability distribution is used for coding an m-value symbol, then the corresponding CDF stored in the CDF table would include (m−1) probability values since the $m^{th}$ probability value is derivable from the (m−1) probabilities values.

Some of the CDF table entries may be four-symbol CDFs (for coding syntax elements that can take on the values 0, 1, 2, and 3) and some may be six-symbol CDFs (for coding syntax elements that can take on the values 0, 1, 2, 3, 4, 5). To illustrate, if a transform coefficient is in a default region of the transform block, then the base level of the transform coefficient can be assumed to be one of the values 0 to 3 (i.e., the base value is a four-value symbol) and a four-symbol CDF is selected; on the other hand, if the coefficient is in the low-frequency (LF) region of the transform block, then the base level can be assumed to be one of the values 0 to 5 and a six-symbol CDF is selected.

Whether a coefficient is in the default or the LF region can be determined based on the location of the coefficient in the transform block. For example, if (row+col<threshold) (e.g., threshold=4 or some other value) for a coefficient, then the coefficient is considered to be in the LF region; otherwise, the coefficient is in the default region. Row and col indicate the row and col location of the current transform coefficient in the transform block. The formula for determining whether a coefficient is in the default or the LF region can be different for the luma and the chroma components. In an example, the formula can vary by transform type, by transform block size, by some other criteria, or a combination thereof. To illustrate, the formula used with a horizontal 1-dimensional transform type may be: if (col<2), then the coefficient is considered to be in the LF region. In general, the LF region covers the coefficients near the upper/left (i.e., low frequency) area of the transform block.

By using the six-value symbol in the LF region, the data can be more accurately represented and with less loss than would be possible using only four values. This can help to improve the overall visual quality of the compressed video. On the other hand, by using the four-value symbol in the default region, video codecs can compress the data more efficiently, using shorter codewords for the most frequently occurring symbols.

The four-value and six-value symbols can be used to efficiently represent ranges of quantized transform coefficient magnitudes. Each symbol can correspond to a specific magnitude range. To illustrate, using the four-value symbol, Symbol 0 (Base Range-BR) may represent the smallest magnitudes, typically centered around zero; Symbols 1-2 (Low Ranges—LR) may represent progressively larger magnitude ranges; and Symbol 3 (High Range—HR) may represents the largest magnitudes. To further refine the representation, each symbol may be paired with a residual value. This residual value is the difference between the actual coefficient magnitude and the lower bound of the magnitude range represented by the symbol. For example, if a coefficient has a magnitude of 7, and it falls within the range assigned to symbol 2, the residual value for this coefficient would be 1, calculated as 7 (actual magnitude)−6 (lower bound of symbol 2's range).

Table I below illustrates a non-limiting example of symbols and how the absolute value (i.e., the magnitude) may be represented by the six-value symbol set.

TABLE I

| Symbol | Transform Coefficient Magnitude |
|--------|----------------------------------|
| 0 (BR) | 0-2 |
| 1 (LR1) | 3-5 |
| 2 (LR2) | 6-8 |
| 3 (LR3) | 9-11 |
| 4 (LR4) | 12-14 |
| 5 (HR) | $15-2^{16}$ |

In an example, the CDF table may include 128 entries (i.e., 128 pre-defined CDFs). In an example, the CDF table may include more or less than 128 entries. Further, different variations of number of symbols and/or different grouping of symbols according to different coefficient ranges can be performed to optimize efficiency in entropy coding.

In some implementations, each entry (of the set of entries in the CDF table) may be represented by an expected value which corresponds to the sum of values resulting from multiplication of each respective symbol value with each respective probability value for the respective symbol value. For example, determination or computation of expected value can take a form of equation (2):

$$\text{Expected value} = \text{sum of (each symbol value} * \text{probability)} \quad (2)$$

The CDF table may be ordered based on the expected value (such as from a highest expected value to a lowest expected value). The expected value corresponds to a weighted sum of symbol values of all symbols within a respective entry or average symbol value of all symbols within the respective entry. For example, for a six-value symbol (0, 1, 2, 3, 4, 5), assuming that probabilities of the six symbols in a respective entry correspond to 0.4 for symbol 0, 0.3 for symbol 1, 0.1 for symbol 2, 0.1 for symbol 3, 0.05 for symbol 4, and 0.05 for symbol 5, then the expected value for the entry would be (0*0.4)+(1*0.3)+ (2*0.1)+(3*0.1)+(4*0.05)+(5*0.05)=0+0.3+0.2+0.3+0.2+ 0.25=1.25. Mapping the predictor value to a corresponding entry in the CDF table may include using the predictor value to look up (e.g., identify, select, retrieve, etc.) a corresponding pre-defined CDF.

The index can be derived from the expected value. To illustrate, the expected value may not be a whole (i.e., integer) number. However, the CDF table is indexed based on integer locations. In an example, the index value may be obtained by, for example, rounding the expected value. In an example, the upper n bits of the predictor value can be used as an index into the CDF table.

Figure 8:
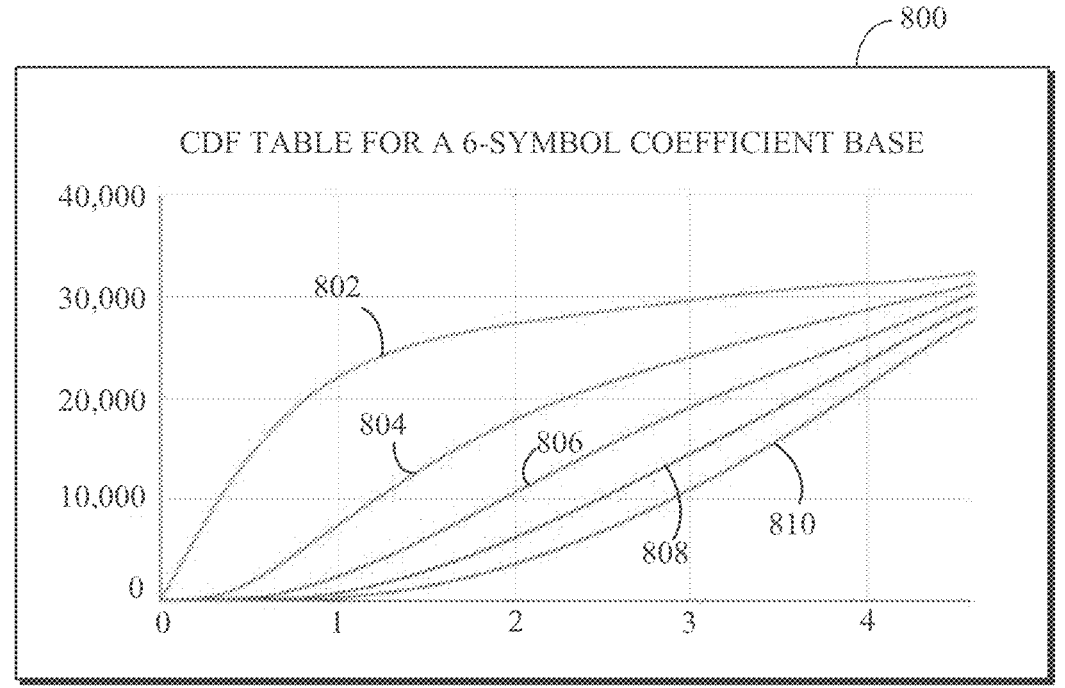
FIG. 8 illustrates two graphs that depict example CDF tables for six-value and four-value symbol sets, respectively.
Figure 8:
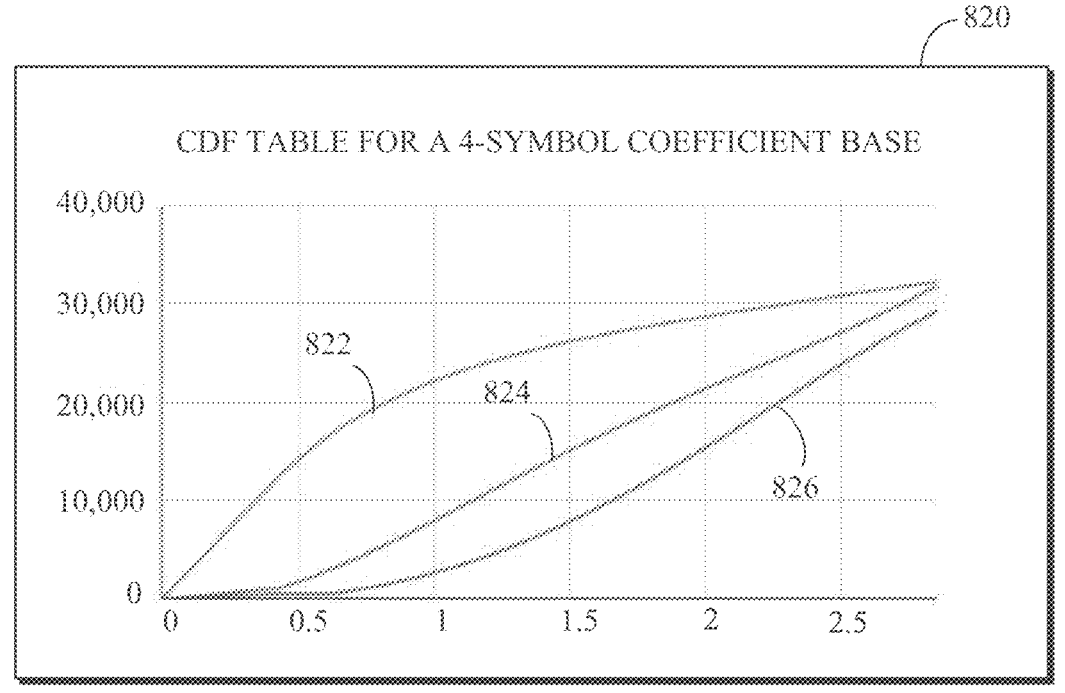

FIG. 8 illustrates two graphs, 800 and 820, that depict example CDF tables for six-value and four-value symbol sets, respectively. The graphs 800 and 820 show the correlation between CDFs and table indexes (or expected values of the entries). As mentioned, individual (e.g., context-specific) coefficient base CDFs are replaced with a table of fixed CDFs. Instead of maintaining individual CDFs per context, a single predictor (e.g., a 16-bit predictor) can be maintained for each context. The upper bits of the predictor can be used as the index into the table. The predictor value, which encapsulates information about the expected coefficient statistics, is typically quantized or scaled and then used to directly index into the CDF table. This allows for quick selection of the appropriate pre-determined CDF without complex computations.

In the graph 800, the CDF table for a six-value symbol set (e.g., symbol values 0, 1, 2, 3, 4, 5) is presented. The graph may be stored in a memory (e.g., memory 204 of FIG. 2) and utilized or retrieved for entropy coding according to implementations of this disclosure. The y-axis represents the CDF (pre-defined CDF or cumulative probability), while the x-axis represents the table index. The table index can be generated based on the predictor value and scaled to match the expected values of the entries in the CDF table. The curves 802 through 810 correspond to the values 0 through 4, respectively. The CDF for the highest value (symbol 5) is always 1, and therefore, a separate curve for it is not necessary and is not shown. The CDFs may have been derived by analyzing multiple data streams and creating histograms for each context, which represent the frequency of use for each symbol.

Similarly, the graph 820 shows the CDF Table for a four-value symbol set (e.g., symbol values 0, 1, 2, 3). The y-axis represents the CDF, and the x-axis represents the table index. The curves 822 through 826 correspond to the values 0 through 2, respectively. The CDF for the highest value (symbol 3) is always 1, so it is not necessary and is not shown. The CDFs are derived through a similar process of analyzing data streams and creating histograms. The shape of each curve in graphs 800 and 820 indicates the probability distribution of that symbol for the particular context.

The graphs 800 and 820 can be used to find or estimate the CDF of symbols for a particular context. Mapping the predictor value to a respective entry in the CDF table enables the encoder/decoder to select the most appropriate pre-determined CDF and use it to efficiently encode/decode the coefficients.

At 606, a symbol (e.g., the coefficient base value) corresponding to the element of the sequence being coded is entropy coded using the probability model (e.g., the pre-determined CDF). When implemented by the encoder, coding the symbol means entropy encoding the symbol into a compressed bitstream, such as the compressed bitstream 420 of FIG. 4; and when implemented by the decoder, coding the symbol means entropy decoding the symbol from a compressed bitstream, such as the compressed bitstream 420 of FIG. 5. In some implementations, the value may be binarized for coding. In the implementations discussed herein, the probability model described above allows for entropy coding of the value without binarization. To do so, the observation is generally represented by one or more symbol(s) or token(s) that represent ranges of values for the syntax element, context modeling, and arithmetic coding.

The probability model may be equivalently expressed by a Probability Mass Function (PMF) or the CDF of a variable. For example, an M-ary random variable has a PMF defined as follows:

$$\bar{P}_n = [p_1(n), p_2(n), \ldots, p_M(n)] \qquad (3)$$

The variable has M possible outcomes for an observation at time n (e.g., the location in a sequence being coded). In this example, $M \in [2,16]$. Each of the probabilities is non-negative and their sum is 1. The probability model of an M-ary coding scheme for the variable may be represented by the following CDF:

$$\bar{C}_n = [c_1(n), c_2(n), \ldots, c_{M-1}(n), 1] \qquad (4)$$

The probability $c_k(n)$, also referred to as a cumulative probability herein, is the probability that the variable, evaluated at k, will take on a value less than or equal to k, where k is an integer such that $k \in \{1, 2, \ldots M\}$.

Context modeling for a respective symbol to be coded, also called context derivation, may be based on an expected correlation of the symbol to symbols representing the other observations of the syntax elements. For example, the context for coding the BR symbol may be conditioned on the previously coded coefficients of the current transform block, and optionally on one or more neighboring samples from other transform blocks within the current frame. Context modeling for each of the LR symbols may be conditioned on previously coded coefficients of neighboring samples. The neighboring samples may be determined based on the transform kernel or type—that is, the neighboring samples for one transform kernel, such as a two-dimensional (2D) transform kernel, may be different from the neighboring samples for another transform kernel, such as a one-dimensional (1D) transform kernel (e.g., a horizontal or vertical transform kernel). Each available transform type within the codec can be classified based on the directionality of its non-identity transformations: vertical-only, horizontal-only, or both. That is, each available transform type in the codec can be classified into one of three categories: those that perform only a vertical non-identity transform, those that perform only a horizontal non-identity transform, and those that perform non-identity transforms in both vertical and horizontal directions.

In the arithmetic coding step, given a context, the symbol is coded by using the context together with the probability from the probability model associated with the symbol in an arithmetic coding engine. The cumulative probability in each entry of equation (4) above may be scaled by $2^{15}$ so that the calculations are done using integers (and not percentages). That is, the cumulative probability $c^k(n)$ is represented by 15-bit unsigned integers so that the arithmetic operations may be completed using integer values. The cumulative probabilities may be scaled by other factors for a different integer resolution in the calculations.

Figure 9:
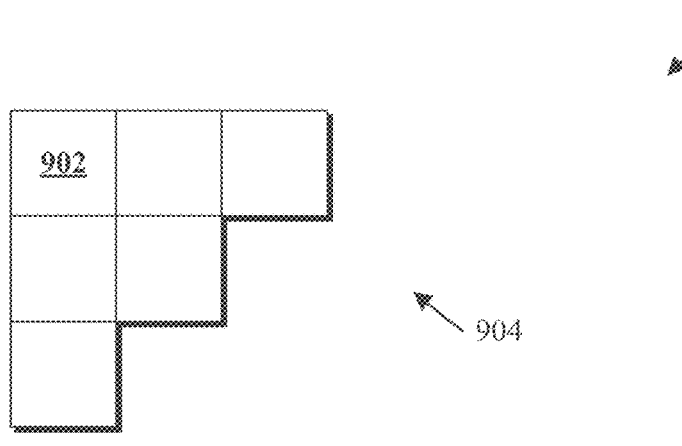
FIG. 9 illustrates examples of contexts based on transform types.
Figure 9:
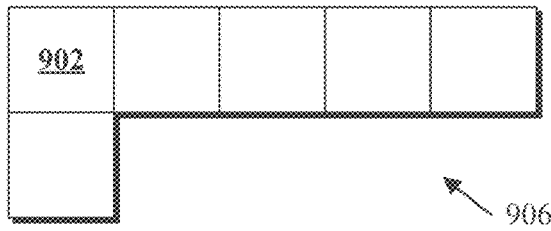
Figure 9:
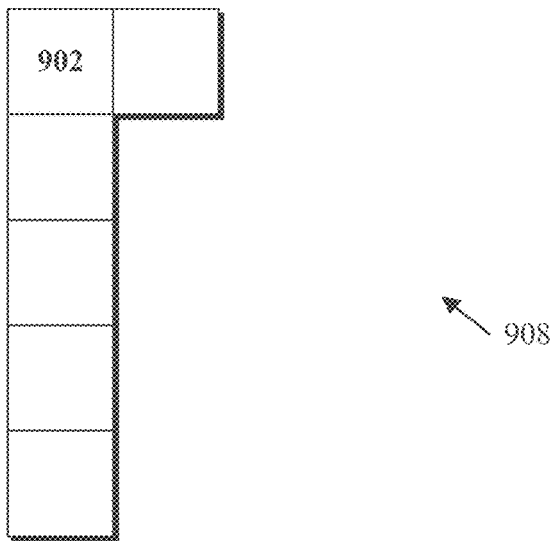

FIG. 9 illustrates examples 900 of contexts based on transform types. As already mentioned, the context model applied may depend, at least in part, on the primary transform directions. When coding a current transform coefficient 902, one of a context 904, a context 906, or a context 908 can be used when the transform type is, respectively, a bi-directional transform type, a horizontal transform type, or a vertical transform type.

More specifically, the contexts 904, 906, and 908 can be used for coding different ranges of the current transform coefficient 902. In an example, the contexts 904, 906, and 908 can be used to code at least the base value of the current transform coefficient 902. The contexts 904, 906, and 908 may also be used as contexts when coding lower ranges of the current transform coefficient 902. In an example, the contexts 904, 906, and 908 may be used for the base value and different contexts (e.g., contexts that include fewer neighboring coefficients) can be used to code at least some of the lower ranges of current transform coefficient 902.

Regardless of the specific neighboring coefficients used as context for the current transform coefficient 902, the context model can be derived using equation (5):

$$\left\{ \begin{array}{l} \text{mag\_ctx} = \left(\left(\sum_{coeff \in all\ context\ neighbors} |coeff|\right) + 1\right) \gg 1 \qquad (5) \\ ctx = \max(\text{mag\_ctx}, N) \end{array} \right.$$

In equation (5), mag_ctx essentially divides the sum of the magnitudes of the context coefficients by 2. Then the context value, ctx, is obtained as the maximum of the values mag_ctx and N, where N is a predetermined maximum value allowed for the magnitude context. Typically N is in the range of [5, 11] to limit the contexts at the high end when there are many large coefficients. Max (see TABLE II) is the highest coefficient magnitude value amongst the context coefficients. To illustrate, given the context magnitudes {1, 1, 0, 0, 1} and {2, 0, 0, 0, 0}, which both result in the same mag_ctx of 2, equation (5) results in using context 2 for {1, 1, 0, 0, 1} and context 3 for {2, 0, 0, 0, 0}. The context value of 1 would be heavily used if the ctx were merely set to mag_ctx, as is conventionally done. However, by setting the context value, ctx, using the maximum of mag_ctx and N, the context value of 1 would be split as shown in Table II therewith resulting in coding gains.

TABLE II

| Sum | 0 | 1 | 2 | 2 | 3 | 4 | 5 | 6 | ... |
|---|---|---|---|---|---|---|---|---|---|
| Max | | | 1 | 2 | | | | | |
| mag_ctx | 0 | 1 | 1 | 1 | 2 | 2 | 3 | 3 | ... |
| ctx | 0 | 1 | 2 | 3 | 4 | 4 | 5 | 5 | ... |

The pseudocode shown in TABLE III can be used to calculate ctx according to equation (5).

TABLE III

```
max = identify context coefficient max magnitude;
sum = calculate sum of context coefficient magnitudes;
if (sum < 3) {
    if (sum == 2 && max == 2) ctx = 3;
    else ctx = sum;
} else { // sum >= 4
    ctx = (sum + 5) >> 1;
}
```

In an example, and to eliminate the need to have to identify the Max value (e.g., by comparing the magnitudes of the context coefficients), ctx can be calculated using the pseudocode of TABLE IV.

TABLE IV

```
sum = calculate sum of context coefficient magnitudes;
if (sum < 3) {
    ctx = sum;
} else { // sum >= 4;
    ctx = (sum + 3) >> 1;
```

Referring again to FIG. 6, after the observation is coded at 606 using the probability model, the probability model is updated at 608. More accurately, the prediction value (and not the CDF itself) is updated. The prediction value, pred, can be updated according to one of equations (6) or (6').

$$\begin{cases} decay = 1 - \left(\dfrac{1}{rate}\right) \\ pred = pred * decay + val * (1 - decay) \end{cases} \tag{6}$$

$$pred = pred - (pred \gg shift) + (val \gg shift) \tag{6'}$$

Equation (6') can be used in a fixed-point implementation of equation (6), where multiplications are replaced by bit shifts. In equations 6) and (6'), val is the value corresponding to the coefficient just coded (i.e., the base value of the immediately previously coded coefficient); pred, on the right hand side of the equations is the current prediction prior to the update; and pred, on the left hand side of the equations, is the update prediction value.

According to some implementations of updating a probability model, a fixed update rate may be used. One known example for decay is 0.95. A fixed update rate, while simple to implement, may not address time variance in the probability distribution. More specifically, a fixed update rate (or decay) may not address the desirability of providing for a higher adaptation rate at the beginning of use of the probability model (e.g., at the beginning of a frame or some portion of a frame). An adaptation rate refers to how quickly the model updates a probability for an observation. Instead of a fixed update rate, the update rate may be formulated to provide a higher adaptation rate at the beginning. The update rate may do this by weighting the probability update for a new symbol differently at the beginning of use of the probability model as compared to later in use. The update rate may consider how many symbols are coded before and with the coding of the current observation. The update rate may be a deterministic update rate that provides the higher adaptation rate at the beginning than after a defined time has passed. One time-variant update rate for a probability model (e.g., for a respective symbol) that may be used is shown below.

$$\alpha = 1/2^{3 + I(count>15) + I(count>30) + min(log_2(M),2)} \tag{7}$$

In equation (7), count refers to the number (e.g., cardinality) of symbols coded through the current observation. I (comparison) is a function that returns 1 if comparison is true (that is, if count>15 and/or count>30) and otherwise returns 0 (i.e., if the comparison is not true). Equation (7) achieves the functionality of providing the higher adaptation rate at the beginning while slowing down and/or stabilizing as more observations are received. The threshold values used for comparison to count may vary, and there may be more or fewer comparisons.

The technique 600 may continue by checking for more syntax elements for coding at 610 (e.g., after coding each symbol of the current observation according to the teachings herein). If there are no further syntax elements, the technique 600 ends, at 612, for the current sequence of syntax elements. If there are more syntax elements to code, the technique 600 proceeds back to 604.

The technique 600 may be used for both entropy encoding and entropy decoding. The description above uses an example where the sequence of syntax elements comprises the transform coefficients for encoding for simplicity of explanation. For decoding, the sequence of syntax elements may include codewords (e.g., sequences of bits) that represent the encoded variables, such as EOB positions, quantized coefficients, etc.

When no predictor is yet available (e.g., set or established) for a CDF, such as when coding a very first symbol, the predictor for a context can be initialized using equation (8), where a and b are constants that are empirically derived. That is, fixed-point predictors can be initialized with a linear model (in the log domain), based on qindex (quantization index) which refers to an index that determines the quantization parameter used for compressing the current block. The qindex can be a value that is used to derive the actual quantization parameter (QP). pred [ctx] represents the predictor value for a specific context (ctx), which could be a specific condition or state in the entropy coding process; the function clip ( ) limits the calculated value to a specified range to prevent it from going beyond acceptable limits; and $2^{pred_{log\ 2}}$ calculates 2 raised to the power of the temporary variable $pred_{log\ 2}$ effectively converting the logarithmic value to a linear scale.

$$\begin{cases} pred_{log2} = a + b * qindex \\ pred[ctx] = clip(2^{pred_{log2}}) \end{cases} \tag{8}$$

Another approach to entropy coding is to use two predictor values that are derived with two different symbol adaptation speed. For example, determining the predictor value for the symbol for the next syntax element of the sequence may include using a first predictor function to determine a first predictor value, and using a second predictor function to determine a second predictor value, in which the second predictor function utilizes a different decay value than that of the first predictor function. After determining two predictor values, the two predictor values may be weighted (e.g., averaged) to determine the predictor value that may be used to as a look up to the CDF table or generate an index that may be adapted into the CDF table. By doing so, adaptation rate of symbol, predictor value, and/or index into the CDF table (e.g., table of pre-determined CDFs) can be more flexible and hence can improve coding efficiency.

Figure 10:
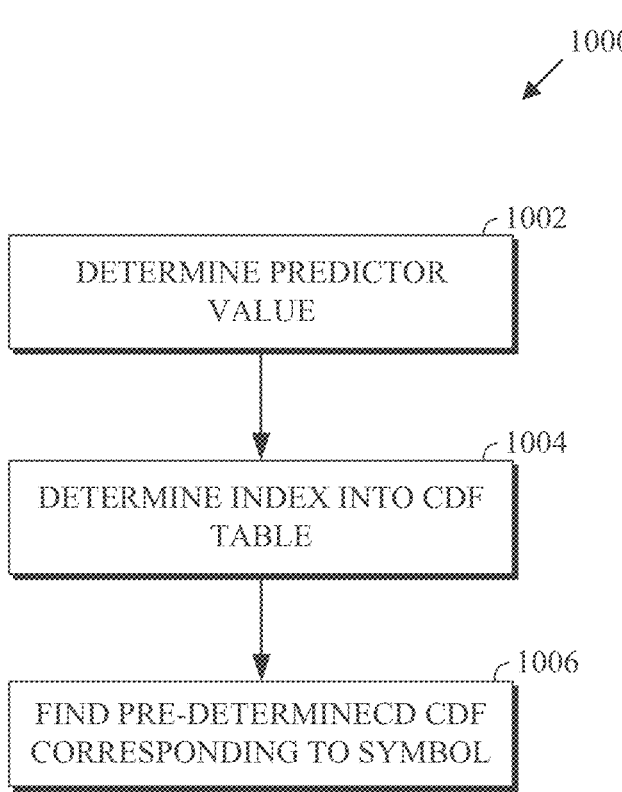
FIG. 10 is a flowchart of a technique for determining a pre-defined CDF for a symbol for a next syntax element of sequence.

FIG. 10 is a flowchart of a technique 1000 for determining a pre-defined CDF for a symbol for a next syntax element of sequence. As mentioned above, this determination eliminates a need to update the CDF with changes in the statistical distribution of the data stream over time. Stated differently, a fixed approach according to implementations in this disclosure uses a pre-defined (e.g., fixed) set of CDFs for syntax elements in the data stream and the predictor function that generates a predictor value and/or an index which adapts to changes in the statistical distribution of the data stream over time.

The technique 1000 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as the processor 202 of FIG. 2, may cause the computing device to perform the technique 1000. The technique 1000 can be implemented using specialized hardware or firmware. Multiple processors, memories, or both, may be used. The technique 1000 may be performed at an entropy coding stage of an encoder, such as the entropy encoding stage 408 of the encoder 400, the entropy coding stage of a decoder, such as the entropy decoding stage 502 of the decoder 500, or the entropy coding stage of both an encoder and a decoder.

At 1002, a predictor value for selecting a CDF for coding a next value is determined. In determining the predictor value, a predictor function may be used to compute or generate the predictor value, which in turn may be used (e.g., as a lookup) to find and/or identify (e.g., select or retrieve) the pre-defined CDF for coding the symbol for the next syntax element in the sequence. For example, the predictor function may be used to determine a predictor value based on a previously observed symbol and a previous predictor value for the previously observed symbol. For example, the prediction function may be a regression model which can take a form of equation (1) described above with respect to FIG. 6.

After computing or generating the predictor value, such predictor value may be used to find the pre-defined CDF (or cumulative probability) is a set of pre-defined set of CDFs. For example, the predictor value can be mapped into a CDF table that includes the pre-defined set of CDFs. For example, as described above (with respect to discussion of FIG. 6), the CDF table may have a set of entries, where each entry may have a four-value symbol (0, 1, 2, 3) (e.g., four symbols) in the default region and/or a six-value symbol (0, 1, 2, 3, 4, 5) (e.g., six symbols) in the low-frequency region. Moreover, each entry may be represented by an expected value which corresponds to a sum of values resulting from multiplication of each respective symbol value with each respective probability value for the respective symbol value.

At 1004, an index into the CDF table is generated based on the predictor value. For example, the index may be scaled to match the expected value of a respective entry of the CDF table. For example, the index value may be adjusted (e.g., rounded) to fall within a range or precision to match the expected value of the respective entry. For example, in some cases, the index can have higher precision than necessary for a particular application, and rounding the upper n bits (e.g., discarding or approximating the n most significant bits or n highest-order bits) may reduce the precision of the index just enough to perform accurate matching while retaining computational efficiency and/or reducing the storage requirement.

The index may be generated or updated each time the predictor value is generated or updated for a corresponding symbol. Such an index may be used as a lookup index for a respective entry, a respective symbol, and/or a pre-determined CDF corresponding to the symbol in the CDF table. Accordingly, the index may adapt to statistical distribution changes in the data stream, as the index is associated with changes of the predictor value.

In an example, the index can be obtained using the pseudocode of Table V.

TABLE V

```
static inline int coeff_base_pred_idx(aom_coeff_prob pr) {
    int idx = pr.prob >> (16 – 9);
    if (idx < 64) {
        idx >>= 1;
    } else {
        idx >>= 2;
        idx += 16;
    }
    return idx; // [0,143]
}
```

At 1006, a pre-determined CDF corresponding to the index is retrieved for coding the symbol. For example, the index may be used as a lookup index for a respective entry, a respective symbol, and/or a pre-determined CDF corresponding to the symbol in the CDF table.

Once the pre-determined CDF corresponding to the symbol for the next syntax element is found or identified, such pre-determined CDF may be used to entropy code a corresponding coefficient for a block of data.

Figure 11:
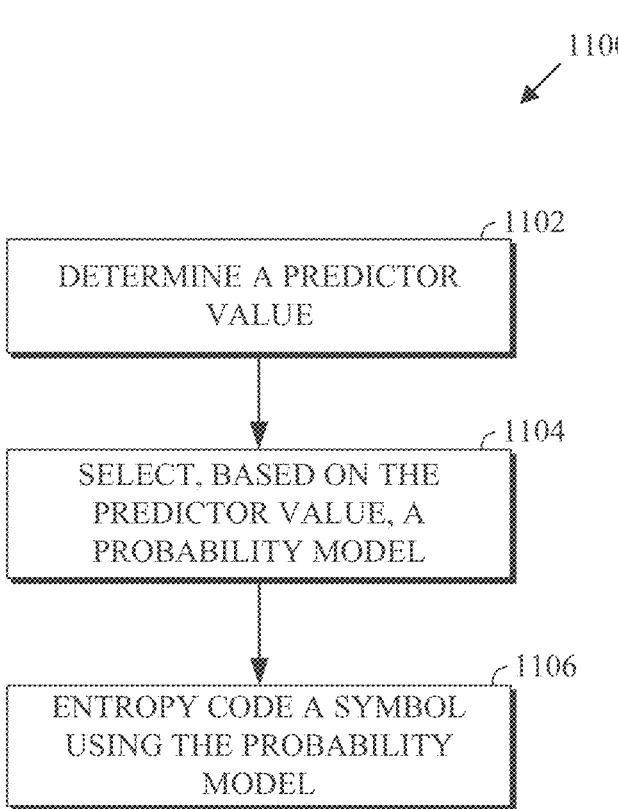
FIG. 11 is a flowchart of a technique for entropy coding a sequence of transform coefficients.

FIG. 11 is a flowchart of a technique 1100 for entropy coding a sequence of transform coefficients. The technique 1100 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as the processor 202, may cause the computing device to perform the technique 1100. The technique 1100 can be implemented using specialized hardware or firmware. Multiple processors, memories, or both, may be used. The technique 1100 may be performed at an entropy coding stage of an encoder, such as the entropy encoding stage 408 of the encoder 400, the entropy coding stage of a decoder, such as the entropy decoding stage 502 of the decoder 500, or the entropy coding stage of both an encoder and a decoder.

At 1102, a predictor value corresponding to a transform coefficient of a sequence of transform coefficients is determined. The predictor value can be determined (e.g., calculated) as described with respect to one of equations (1), (6), or (6'). As such, the predictor value may be calculated based on a previous predictor value used for coding an immediately preceding symbol associated with an immediately preceding transform coefficient of the sequence of transform coefficients. The predictor value may be further calculated based on the immediately preceding symbol.

At 1104, based on the predictor value, a probability model is selected from a set of pre-defined probability models. Selecting the probability model can include obtaining an index based on the predictor value and using the index to look up in a table of the pre-defined probability models. The index can be obtained by quantizing or scaling the predictor value. Quantizing the predictor value can include using a subset of the bits of the predictor value as the index. The selection of the probability model can also be influenced by a context associated with the transform coefficient, such as its location in a transform block.

At 1106, a symbol associated with the transform coefficient is entropy coded using the selected probability model. The symbol may represent a base level of the transform coefficient. The entropy coding process utilizes the selected probability model to efficiently compress the symbol, ensuring that the encoded data is optimized for storage or transmission.

For simplicity of explanation, the techniques 600, 1000, and 1100 of FIGS. 6, 10, and 11, respectively, are each depicted and described as a respective series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor (that is, the computer-readable medium can be a non-transitory computer-readable storage medium). The medium can be, for example, an electronic, magnetic, optical, electromagnetic, or semiconductor device. Other suitable mediums are also available.

The above-described implementations and other aspects have been described to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law to encompass all such modifications and equivalent arrangements.

What is claimed is:

1. A method, comprising:
determining a predictor value corresponding to a transform coefficient of a sequence of transform coefficients, the predictor value being generated by a predictor function that adapts to changes in a statistical distribution of the sequence of transform coefficients over time;
selecting, based on the predictor value, a probability model from a set of pre-defined probability models; and
entropy coding a symbol associated with the transform coefficient using the probability model.

2. The method of claim 1, wherein selecting the probability model comprises:
obtaining an index based on the predictor value; and
using the index into a table of the pre-defined probability models.

3. The method of claim 2, wherein obtaining the index based on the predictor value comprises:
quantizing or scaling the predictor value to obtain the index.

4. The method of claim 1, wherein the symbol associated with the transform coefficient represents a base level of the transform coefficient.

5. The method of claim 1, wherein determining the predictor value corresponding to the transform coefficient of the sequence of the transform coefficients comprises:
calculating the predictor value based on a previous predictor value used for coding an immediately preceding symbol associated with an immediately preceding transform coefficient of the sequence of the transform coefficients.

6. The method of claim 5, wherein the predictor value is calculated further based on the immediately preceding symbol.

7. The method of claim 1, wherein selecting the probability model based on the predictor value comprises:

selecting the probability model based on a location of the transform coefficient in a transform block.

8. A device, comprising:

a processor configured to execute instructions to:

determine a predictor value corresponding to a transform coefficient of a sequence of transform coefficients, the predictor value being generated by a predictor function that adapts to changes in a statistical distribution of the sequence of transform coefficients over time;

select, based on the predictor value, a probability model from a set of pre-defined probability models; and entropy code a symbol associated with the transform coefficient using the probability model.

9. The device of claim 8, wherein to select the probability model comprises to:

obtain an index based on the predictor value; and use the index into a table of the pre-defined probability models.

10. The device of claim 9, wherein to obtain the index based on the predictor value comprises to:

quantize or scale the predictor value to obtain the index.

11. The device of claim 8, wherein the symbol associated with the transform coefficient represents a base level of the transform coefficient.

12. The device of claim 8, wherein to determine the predictor value corresponding to the transform coefficient of the sequence of the transform coefficients comprises to:

calculate the predictor value based on a previous predictor value used for coding an immediately preceding symbol associated with an immediately preceding transform coefficient of the sequence of the transform coefficients.

13. The device of claim 12, wherein the predictor value is calculated further based on the immediately preceding symbol.

14. The device of claim 8, wherein to select the probability model based on the predictor value comprises to:

select the probability model based on a location of the transform coefficient in a transform block.

15. A non-transitory computer-readable storage medium, comprising executable instructions that, when executed by a processor, facilitate performance of operations, comprising:

determining a predictor value corresponding to a transform coefficient of a sequence of transform coefficients, the predictor value being generated by a predictor function that adapts to changes in a statistical distribution of the sequence of transform coefficients over time;

selecting, based on the predictor value, a probability model from a set of pre-defined probability models; and entropy coding a symbol associated with the transform coefficient using the probability model.

16. The non-transitory computer-readable storage medium of claim 15, wherein selecting the probability model comprises:

obtaining an index based on the predictor value; and using the index into a table of the pre-defined probability models.

17. The non-transitory computer-readable storage medium of claim 16, wherein obtaining the index based on the predictor value comprises:

quantizing or scaling the predictor value to obtain the index.

18. The non-transitory computer-readable storage medium of claim 15, wherein the symbol associated with the transform coefficient represents a base level of the transform coefficient.

19. The non-transitory computer-readable storage medium of claim 15, wherein determining the predictor value corresponding to the transform coefficient of the sequence of the transform coefficients comprises:

calculating the predictor value based on a previous predictor value used for coding an immediately preceding symbol associated with an immediately preceding transform coefficient of the sequence of the transform coefficients.

20. The non-transitory computer-readable storage medium of claim 15, wherein selecting the probability model based on the predictor value comprises:

selecting the probability model based on a location of the transform coefficient in a transform block.

* * * * *